United States Patent
Vora et al.

(10) Patent No.: US 10,909,123 B2
(45) Date of Patent: Feb. 2, 2021

(54) SYSTEMS AND METHODS FOR PROVIDING ENTITY ACCOUNT ADMINISTRATOR FEEDS

(71) Applicant: Facebook, Inc., Menlo Park, CA (US)

(72) Inventors: Neal Suresh Vora, San Jose, CA (US); James Donovan, San Francisco, CA (US); Deepak Chinavle, Kirkland, WA (US); Gaurav Dosi, Emeryville, CA (US); Jason Eric Brewer, Kirkland, WA (US); Bradley Ray Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 259 days.

(21) Appl. No.: 15/360,550

(22) Filed: Nov. 23, 2016

(65) Prior Publication Data
US 2018/0143981 A1    May 24, 2018

(51) Int. Cl.
    *G06F 7/00*      (2006.01)
    *G06F 16/00*     (2019.01)
    *G06F 16/2457*   (2019.01)
    *H04L 12/58*     (2006.01)
    *G06F 16/248*    (2019.01)
    *G06F 16/28*     (2019.01)

(52) U.S. Cl.
    CPC ...... *G06F 16/24578* (2019.01); *G06F 16/248* (2019.01); *G06F 16/285* (2019.01); *H04L 51/32* (2013.01)

(58) Field of Classification Search
    None
    See application file for complete search history.

(56) References Cited

U.S. PATENT DOCUMENTS

| | | | |
|---|---|---|---|
| 7,840,522 B2 * | 11/2010 | Liu | G06F 17/3053 706/45 |
| 8,386,601 B1 * | 2/2013 | Sutter | H04N 21/2402 705/14.51 |
| 2011/0113057 A1 * | 5/2011 | Lee | G06Q 10/10 707/769 |
| 2011/0302221 A1 * | 12/2011 | Tobin | G06F 16/24575 707/805 |
| 2011/0307695 A1 * | 12/2011 | Slater | G06F 21/604 713/163 |
| 2012/0059795 A1 * | 3/2012 | Hersh | G06F 7/78 707/628 |
| 2012/0294514 A1 * | 11/2012 | Saunders | G06K 9/00677 382/159 |
| 2013/0031487 A1 * | 1/2013 | Olsen | G06Q 50/01 715/751 |
| 2013/0218885 A1 * | 8/2013 | Satyanarayanan | G06Q 30/016 707/728 |

(Continued)

*Primary Examiner* — Tuan A Pham
(74) *Attorney, Agent, or Firm* — Sheppard Mullin Richter & Hampton LLP

(57) ABSTRACT

Systems, methods, and non-transitory computer-readable media can select a set of selected pages from a plurality of pages on a social networking system based on page selection criteria. A set of potential stories from the set of selected pages is aggregated. The set of potential stories are ranked based on ranking criteria. An administrator feed associated with a first page is generated, the administrator feed comprising a plurality of stories from the set of potential stories based on the ranking the set of potential stories.

20 Claims, 8 Drawing Sheets

(56) References Cited

U.S. PATENT DOCUMENTS

| | | | |
|---|---|---|---|
| 2014/0081947 A1* | 3/2014 | D'Urso | G06F 16/951 |
| | | | 707/709 |
| 2014/0188627 A1* | 7/2014 | Elvekrog | G06Q 30/02 |
| | | | 705/14.66 |
| 2015/0026604 A1* | 1/2015 | Mulukuri | G06Q 50/01 |
| | | | 715/758 |
| 2016/0036973 A1* | 2/2016 | Harasimiuk | H04L 51/32 |
| | | | 379/265.13 |

\* cited by examiner

SYSTEMS AND METHODS FOR PROVIDING ENTITY ACCOUNT ADMINISTRATOR FEEDS

FIELD OF THE INVENTION

The present technology relates to the field of social networking systems. More particularly, the present technology relates to providing entity account administrator feeds.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

User experience associated with a social networking system can be enhanced as the social networking system becomes more knowledgeable about the users that it serves. When knowledge of a user is gained, content, advertising, tools, and other services can be optimized for presentation to the user. Such potentially helpful knowledge about the user can include information about the user as an individual as well as the user's activity on the social network. Knowledge about the user can be utilized to provide features that increase user interest in and engagement with the social networking system.

SUMMARY

Various embodiments of the present disclosure can include systems, methods, and non-transitory computer readable media configured to select a set of selected pages from a plurality of pages on a social networking system based on page selection criteria. A set of potential stories from the set of selected pages is aggregated. The set of potential stories are ranked based on ranking criteria. An administrator feed associated with a first page is generated, the administrator feed comprising a plurality of stories from the set of potential stories based on the ranking the set of potential stories.

In an embodiment, the set of selected pages comprises a set of administrator selected pages.

In an embodiment, the set of selected pages further comprises a set of automatically selected pages.

In an embodiment, the set of automatically selected pages comprises at least one of: a set of similar pages, a set of successful pages, a set of potential collaborator pages, or a set of potential interest pages.

In an embodiment, the set of automatically selected pages comprises a set of similar pages selected based on similarity criteria, and the similarity criteria comprise at least one of: a similar location determination, a similar audience determination, a similar audience size determination, or a similar category determination.

In an embodiment, the set of automatically selected pages comprises a set of successful pages selected based on success criteria, and the success criteria comprise at least one of: page audience size information, page social network engagement information, or page conversion information.

In an embodiment, inclusion in the set of successful pages requires satisfaction of a similarity threshold with reference to the first page.

In an embodiment, the ranking criteria is associated with a first administrator of the first page.

In an embodiment, the ranking criteria is associated with the first page.

In an embodiment, each story of the set of potential stories is associated with a content post on the social networking system from a page of the set of selected pages.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
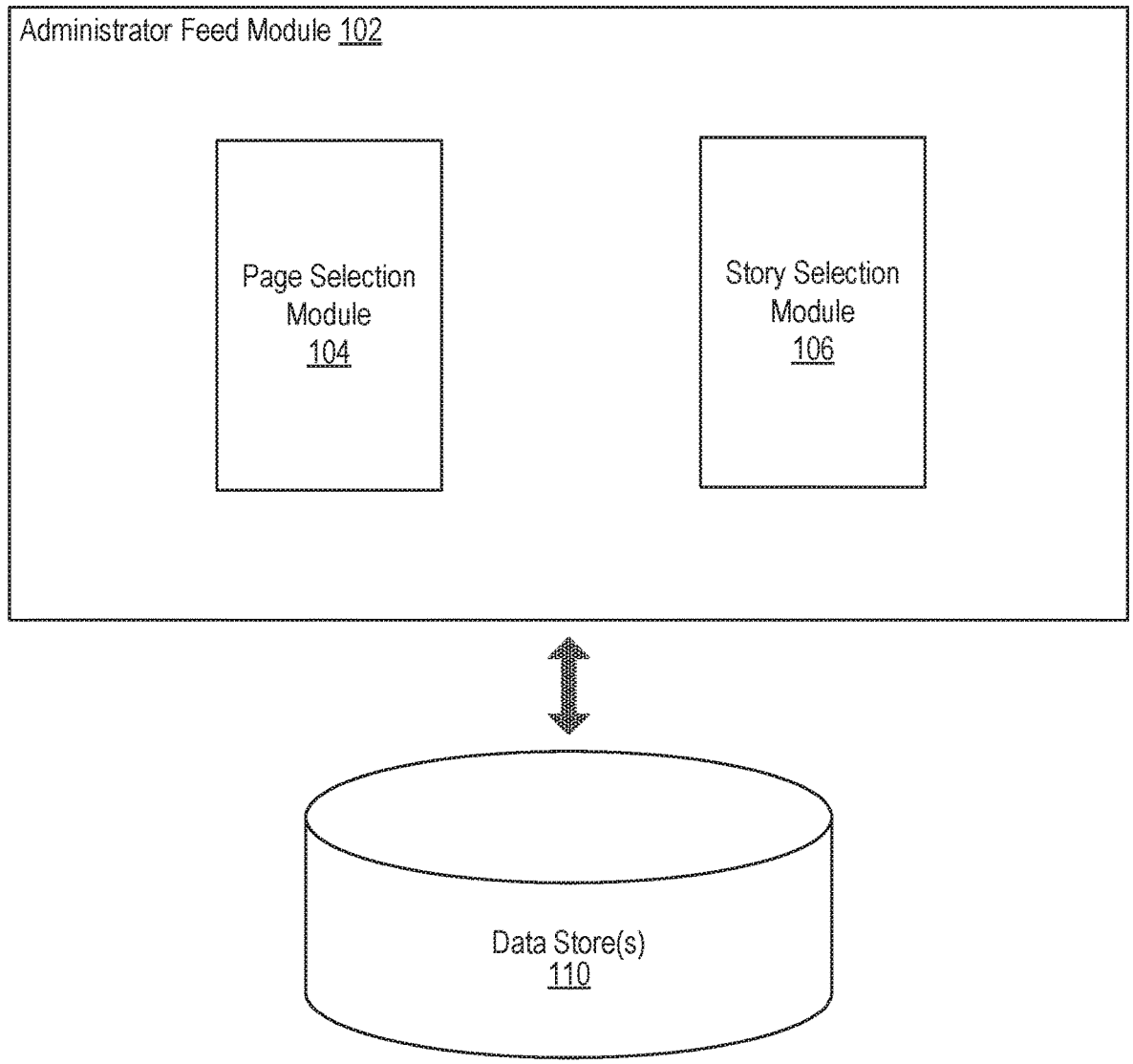
FIG. 1 illustrates an example system including an administrator feed module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Entity Account Administrator Feeds

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

User experience associated with a social networking system can be enhanced as the social networking system becomes more knowledgeable about the users that it serves. When knowledge of a user is gained, content, advertising, tools, and other services can be optimized for presentation to the user. Such potentially helpful knowledge about the user can include information about the user as an individual as well as the user's activity on the social network. Knowledge about the user can be utilized to provide features that increase user interest in and engagement with the social networking system.

A social networking system can support different types of users. For example, an entity account is a type of user on the social networking system associated with a particular entity, and can be controlled by one or more administrators of the entity account, whereas an individual user is another type of user on the social networking system associated with a particular individual. Both individual users and entity accounts can interact with one another on the social networking system. For example, an entity account may have an entity page (or page) on the social networking system, while an individual user may have a profile page (or profile) on the social networking system. An entity account can post content to its page to share with other users on the social networking system, or can interact with content posted by other users on their own pages. Individual users can access a page on the social networking system to, for example, view content posted by the entity account to the page, send messages to the entity account, respond or react to content posted by the entity account to its page, demonstrate support for an entity account (e.g., by liking or following the page), and the like. Interactions between users on a social networking system can be mutually beneficial. For example, an individual user who is a potential customer of an entity account may wish to contact the entity account to ask questions or provide feedback about products or services offered. The entity account may wish to create positive interactions with individual users to improve its reputation in the marketplace and increase sales or visibility. Participation in the social networking system by users can be encouraged and promoted by improving tools and features to facilitate interaction on the social networking system.

It continues to be an important interest for a social networking system to provide entity accounts with tools to facilitate beneficial interactions on the social networking system. Entity account interaction and engagement on the social networking system is an important aspect of maintaining continued interest in and participation on the social networking system. If an entity account feels that its presence on a social networking system is not beneficial, it may stop interacting on the social networking system. It can be difficult for entity accounts to know what types of content and interactions on the social networking system will lead to the most beneficial outcomes for the entity account. For example, it can be difficult for an entity account to determine what types of content posted to its page will lead to the most engagement with the page by other users on the social networking system, or will most effectively lead to increases in sales or bookings.

An improved approach rooted in computer technology overcomes the foregoing and other disadvantages associated with conventional approaches specifically arising in the realm of computer technology. Based on computer technology, the disclosed technology can provide an administrator feed for presentation to administrators of an entity account. The administrator feed can include content items, or "stories," posted to pages by other entity accounts. For example, these stories can include photos, videos, status updates, shared links, and the like, posted by other entity accounts to their own pages on the social networking system. Stories can also include interactions by entity accounts with other user accounts on the social networking system, such as comments on other users' content posts, or responses to other users' comments. In certain embodiments, a set of pages can be selected based on various page selection criteria. For example, pages can be selected based on similarity to a current page, based on various success metrics, and the like. The stories from the set of selected pages can be filtered and/or ranked, and presented in an administrator feed. By viewing the administrator feed, administrators for a current entity account can be presented with ideas for content posts to post to their own page. By providing administrators of entity accounts with examples of what other entity accounts are doing on the social networking system, further entity account interaction on the social networking system can be encouraged. These concepts will be described in greater detail herein.

FIG. 1 illustrates an example system 100 including an example administrator feed module 102 configured to provide an administrator feed, according to an embodiment of the present disclosure. As mentioned previously, an entity account on a social networking system can be controlled by one or more administrators of the entity account. When an administrator of an entity account logs into the social networking system, the administrator can be presented with an administrator feed comprising a plurality of stories associated with content postings and/or social networking system interactions by other entity accounts on the social networking system. The stories presented in the administrator feed may be beneficial to the current entity account in several ways. For example, the stories may provide the entity account with some knowledge as to the social networking system activities of other entity accounts. This knowledge can provide the entity account with, for example, a better understanding of the marketplace, inspiration for its own content posts to the social networking system, and an improved understanding of what types of content posts and interactions on the social networking system lead to increased user interaction.

As shown in the example of FIG. 1, the administrator feed module 102 can include a page selection module 104 and a story selection module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The administrator feed module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the administrator feed module 102 can be implemented, in part or in whole, as software running on one or more computing devices or systems, such as on a server computing system or a user (or client) computing system. For example, the administrator feed module 102 or at least a portion thereof can be implemented as or within an application (e.g., app), a program, or an applet, etc., running on a user computing device or a client computing system, such as the user device 610 of FIG. 6. In another example, the administrator feed module 102 or at least a portion thereof can be implemented using one or more computing devices or systems that include one or more servers, such as network servers or cloud servers. In some instances, the administrator feed module 102 can, in part or in whole, be implemented within or configured to operate in conjunction with a social networking system (or service), such as the social networking system 630 of FIG. 6. It should be understood that there can be many variations or other possibilities.

The administrator feed module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the administrator feed module 102. For example, the data store 110 can store page information, page story information, page selection criteria, story selection criteria, story ranking criteria, one or more machine learning models, and the like. It is contemplated that there can be many variations or other possibilities.

The page selection module 104 can be configured to select one or more pages on a social networking system based on page selection criteria. The one or more pages can be selected for potential relevance to, interest to, and/or benefit to a current page. For example, the one or more pages may include pages selected by an administrator of the current page (e.g., pages followed by, liked by, or otherwise selected by an administrator of the current page), pages determined to be similar to the current page based on similarity criteria, pages determined to be successful pages based on success criteria, pages determined to be potential collaboration partners with the current page based on collaboration criteria, and/or pages determined to be potentially of interest to the current page based on potential interest criteria. The page selection module 104 is discussed in greater detail herein with reference to FIG. 2.

The story selection module 106 can be configured to select one or more stories for inclusion in an administrator feed based on story selection criteria. In certain embodiments, a set of stories can be aggregated from one or more pages. The one or more pages may be the one or more pages identified by the page selection module 104. The set of aggregated stories can be ranked based on story ranking criteria for inclusion and presentation in the administrator feed. The ranking criteria may rank the set of aggregated stories based on potential interest to a current page and/or based on potential interest to a current administrator of the current page. The story selection module 106 is discussed in greater detail herein with reference to FIG. 3.

Figure 2A:
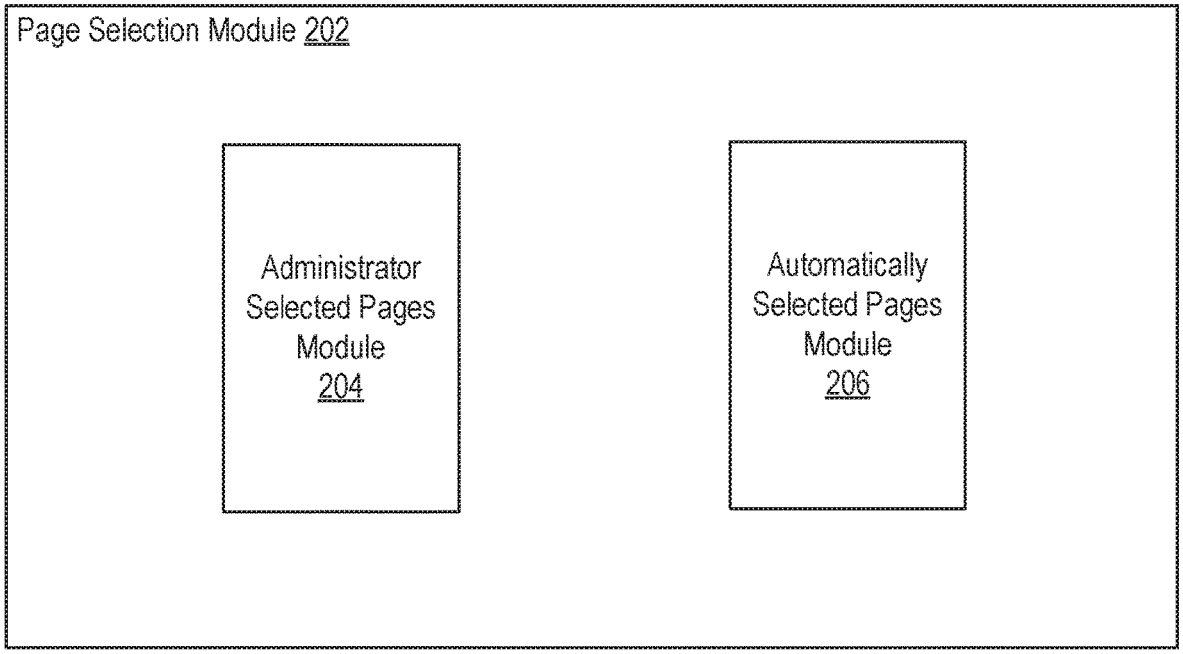
FIG. 2A illustrates an example page selection module, according to an embodiment of the present disclosure.

FIG. 2A illustrates an example page selection module 202 configured to select a set of one or more selected pages based on various page selection criteria, according to an embodiment of the present disclosure. In some embodiments, the page selection module 104 of FIG. 1 can be implemented as the example page selection module 202. As shown in FIG. 2, the page selection module 202 can include an administrator selected pages module 204 and an automatically selected pages module 206.

The administrator selected pages module 204 can be configured to determine one or more administrator selected pages. As will be discussed in greater detail below, stories from the one or more administrator selected pages can be included with stories from other selected pages (e.g., automatically selected pages) for inclusion in an administrator feed. Administrator selected pages can include any pages identified by one or more administrators of a current page. For example, administrator selected pages can include other pages that the current page, or an administrator of the current page, follows or "likes" on a social networking system.

In certain embodiments, an administrator feed can be associated with a particular administrator of a page. In these embodiments, different administrators of the same page may be presented with different administrator feeds, and the pages selected for sourcing content for the administrator feeds may differ from administrator to administrator. As such, in these embodiments, administrator selected pages may be associated with a particular administrator, such that administrator selected pages may differ amongst administrators of the same page. For example, a first administrator of a page could select the pages for Entity 1 and Entity 2 for inclusion in his or her set of administrator selected pages, while a second administrator of a page could select the pages for Entity 2 and Entity 3 for inclusion in his or her set of administrator selected pages. In this scenario, both administrators would potentially receive stories from Entity 2 in their administrator feeds based on their selection of Entity 2's page. However, only the first administrator would have the page for Entity 1 in his or her set of administrator selected pages, and only the second administrator would have Entity 3's page in his or her set of administrator selected pages.

In other embodiments, an administrator feed can be associated with a page, rather than individual administrators of the page. In these embodiments, the set of pages selected for sourcing content for an administrator feed, including the set of administrator selected pages, could be the same for all administrators of the page. As such, if one administrator of a current page selects a first page for inclusion in the set of administrator selected pages, the first page would be included in the set of selected pages for the current page, regardless of which administrator was logged in.

The automatically selected pages module 206 can be configured to automatically select one or more pages. As will be discussed in greater detail below, stories from the one or more automatically selected pages can be included with stories from other selected pages (e.g., administrator selected pages) for potential inclusion in an administrator feed. Pages can be automatically selected based on various page selection criteria. For example, a first set of pages can be selected based on similarity to a current page. In another example, another set of pages can be selected based on the success of the pages. In yet another example, another set of pages can be selected based on the potential for collaboration with the current page. In yet another example, another set of pages can be selected based on potential interest to the current page. Each set of automatically selected pages can be included in a set of selected pages, and stories from the set of selected pages can be used to source an administrator feed. The automatically selected pages module 206 is discussed in greater detail herein with reference to FIG. 2B.

Figure 2B:
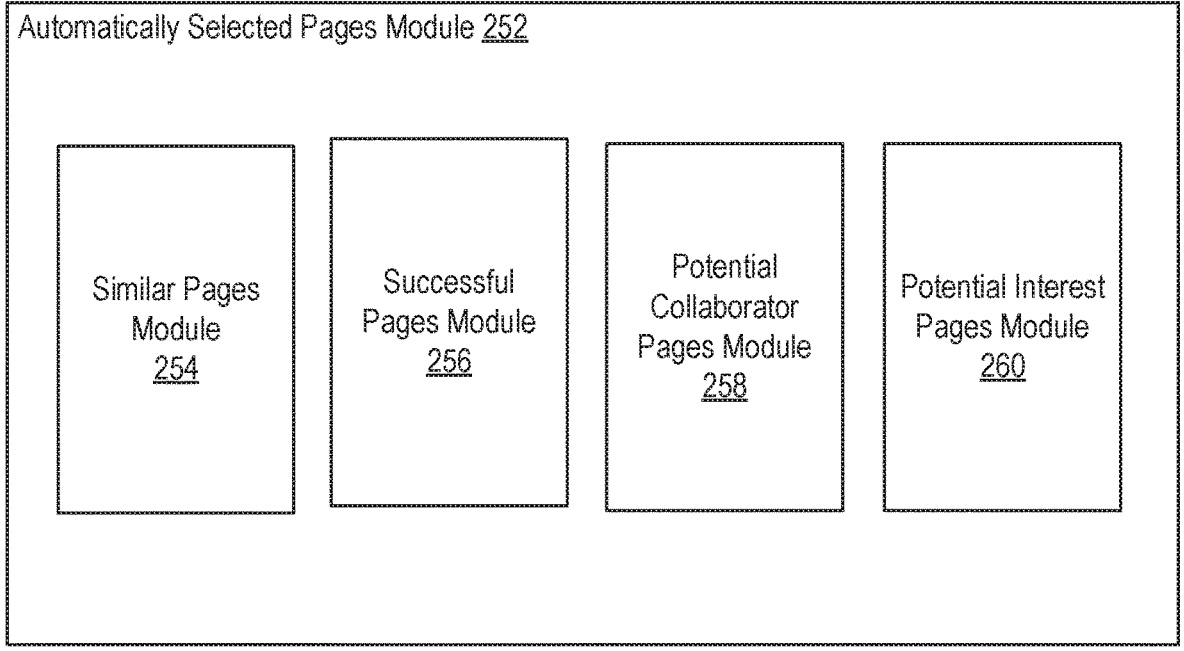
FIG. 2B illustrates an example automatically selected pages module, according to an embodiment of the present disclosure

FIG. 2B illustrates an example automatically selected pages module 252 configured to automatically determine one or more pages based on various page selection criteria for inclusion in a set of selected pages, according to an embodiment of the present disclosure. In some embodiments, the automatically selected pages module 206 of FIG. 2 can be implemented as the example automatically selected pages module 252. As shown in FIG. 2B, the automatically selected pages module 252 can include a similar pages module 254, a successful pages module 256, a potential collaborator pages module 258, and a potential interest pages module 260.

The similar pages module 254 can select one or more pages for inclusion in the set of selected pages based on similarity criteria. The similar pages module 254 can be configured to select one or more pages based on their similarity to a current page. Pages similar to a current page may be selected for inclusion in the set of selected pages so that the current page can ascertain actions taken by other, similar pages on the social networking system. Similarity can be determined based on various similarity criteria. Similarity criteria can include, for example, similarity in audience size (e.g., the number of followers within a threshold number or percentage), similarity in audience membership (e.g., a threshold number of users or proportion of users that follow both pages), similarity in location (e.g., within a threshold distance radius, global v. local, etc.), similarity in types of content produced (e.g., content values within a threshold value), and the like. Similarity criteria can also include, for example, similarity in industry or category. In certain embodiments, similarity in industry or category can be determined by training a machine learning model to determine industries or businesses that are similar. For example, the machine learning model can be trained based on manual categorizations of industries or categories that users identify as similar or related. In certain embodiments, various similarity criteria can be combined to determine an overall similarity score. Pages that satisfy a similarity score threshold and/or a pre-determined number of pages can be selected based on similarity score for inclusion in the set of selected pages.

The successful pages module 256 can be configured to select one or more pages for inclusion in the set of selected pages based on various success criteria. Success criteria can include various criteria for determining the success of a page. For example, success criteria can include one or more criteria based on audience size, e.g., the number of fans or followers of a page. In another example, the success criteria can include one or more criteria based on user engagement with a page, such as an average number of likes, comments, and/or shares for content posted to the page. In yet another example, the success criteria can include one or more criteria based on page outcomes and/or conversions on the page. For example, the page outcomes criteria can include information such as a conversion rate indicative of the percentage of visiting users that result in a positive outcome (e.g., messaging the entity account on the social networking system, or using a "call to action" button to schedule an appointment or get directions to the entity, etc.)

In certain embodiments, the similarity criteria and the success criteria may be used in conjunction with one another to determine one or more pages for inclusion in the set of selected pages. A page administrator of a current page may not be interested in viewing content from all "successful" pages, for example, if those successful pages have no relation or bearing on the current page. As such, in certain embodiments, successful pages may be selected for inclusion in the set of selected pages only if they satisfy a similarity threshold (e.g., a similarity score threshold). In certain embodiments, the similar pages module 254 can select one or more pages based primarily on similarity to the current page, and the successful pages module 256 can select one or more pages based on success as well as some lower similarity threshold.

The potential collaborator pages module 258 can be configured to select one or more pages for inclusion in the set of selected pages based on collaboration criteria. For example, a page for a bakery that specializes in wedding cakes may be interested in viewing content from industry-adjacent entity accounts, such as wedding planners, wedding florists, wedding photographers, and the like, for potential collaboration and referrals. In order to select pages that may represent potential collaboration partners for a current page, a machine learning model can be trained to determine potentially related business industries or categories. For example, the machine learning model can be trained based on historical social networking system interactions in which one page interacted with another page in order to find potential relationships between business categories.

The potential interest pages module 260 can be configured to select one or more pages for inclusion in the set of selected pages based on potential interest criteria. Pages of potential interest to a current page may be determined, for example, based on the administrator selected pages, e.g., pages followed by or liked by the current page. For example, if the current page follows five different coffee house pages, the potential interest pages module 260 can be configured to include other coffee house pages similar to those already followed by the current page. As discussed above, in various embodiments, the administrator feed can differ from one administrator to another, even for the same page. For example, the set of administrator selected pages can differ from administrator to administrator. In such embodiments, the set of potential interest pages can also differ from one administrator to another, and pages of potential interest may be determined based on administrator-specific characteristics. For example, pages of potential interest can be selected based on a particular administrator's set of administrator selected pages.

Figure 3:
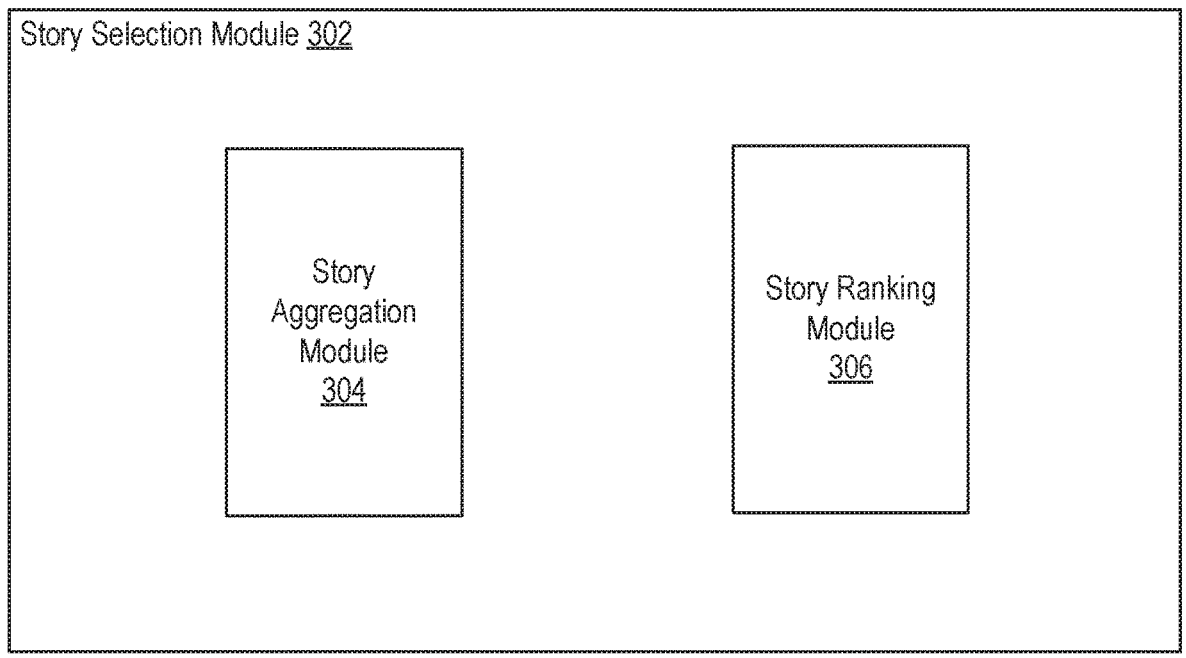
FIG. 3 illustrates an example story selection module, according to an embodiment of the present disclosure.

FIG. 3 illustrates an example story selection module 302 configured to select one or more stories for inclusion in an administrator feed, according to an embodiment of the present disclosure. In some embodiments, the story selection module 106 of FIG. 1 can be implemented as the example story selection module 302. As shown in FIG. 3, the story selection module 302 can include a story aggregation module 304 and a story ranking module 306.

The story aggregation module 304 can be configured to collect and aggregate a set of potential stories from a set of selected pages. For example, the set of selected pages can include all pages selected based on the various selection criteria discussed above (e.g., administrator selected pages, similar pages, successful pages, potential collaborator pages, and potential interest pages). Stories from the set of selected pages can be aggregated into a set of potential stories for potential inclusion in the administrator feed. In certain embodiments, only stories satisfying certain story selection criteria may be included in the set of potential stories. For example, the set of potential stories could include only those stories from a predetermined time period (e.g., the past week, or the past month), or the set of potential stories could include only those stories with a minimal level of user engagement (e.g., minimum level of likes, comments, and/or shares). In other embodiments, all stories from the set of selected pages can be included in the set of potential stories.

The story ranking module 306 can be configured to rank the set of potential stories based on story ranking criteria.

For example, the story ranking criteria can include one or more criteria based on user engagement with a particular story. User engagement can include an absolute number of interactions with the story (e.g., the number of likes, comments, and/or shares) and/or interaction rate criteria (e.g., number of interactions/impression). Story ranking criteria may differ based on characteristics of the current page. For example, if the current page is associated with a local business with a modest number of followers, stories from other local business pages may be ranked higher or given priority, as the local business may not benefit much from seeing stories by, for example, multinational corporations or large conglomerates. However, if the current page is associated with a global brand, then stories from other global brands may be given higher priority.

In certain embodiments, ranking criteria may differ for different administrators of the same page. For example, administrator-specific characteristics, such as a particular administrator's stated interests, a particular administrator's past interactions on a social networking system, or a particular administrator's position or job, may be considered in ranking stories. Conversely, in other embodiments, the actions of various administrators for a page can be aggregated such that story ranking criteria are customized for a particular page, rather than individual administrators.

Stories can be presented in an administrator feed based on the ranking. For example, the administrator feed for a current page or administrator can present stories from other pages in order of the ranking of the stories. In certain embodiments, only stories satisfying a ranking threshold may be selected for presentation in the administrator feed.

Figure 4:
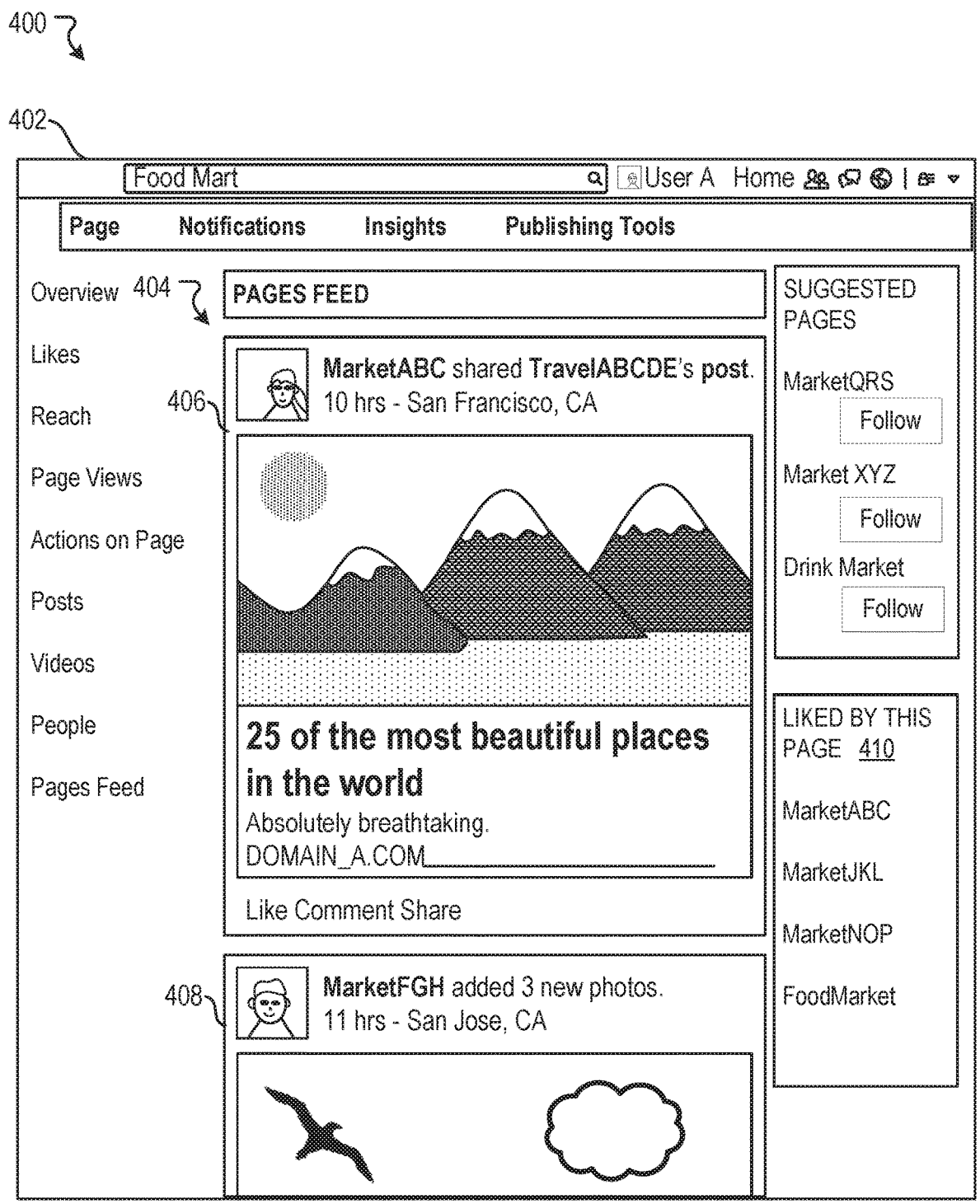
FIG. 4 illustrates an example scenario associated with presenting an administrator feed, according to an embodiment of the present disclosure.

FIG. 4 illustrates an example scenario 400 associated with presenting an administrator feed, according to an embodiment of the present disclosure. The example scenario 400 includes a user interface 402 including an administrator feed 404 (referred to as a "Pages Feed" in this example scenario). In the example scenario 400, a user "User A" is logged into a social networking system as an administrator of a page associated with an entity account for "Food Mart." The administrator feed 404 comprises a plurality of stories from other pages. A first story 406 is a content post by the MarketABC page. A second story 408 is a content post by the MarketFGH page. As discussed above, the MarketABC page and the MarketFGH page have been selected for inclusion in a set of selected pages based on page selection criteria. It can be seen in a "LIKED BY THIS PAGE" box 410, that the Food Mart page has liked the MarketABC page, but has not liked the MarketFGH page. In this example scenario, the MarketABC page may have been selected for inclusion in the set of selected pages because it is a page that the Food Mart page has liked (i.e., it is an administrator selected page), and the MarketFGH page may have been automatically selected for inclusion in the set of selected pages, for example, due to its similarity to the Food Mart page. Stories from these two pages have been selected for inclusion and presentation in the administrator feed 404 based on story ranking criteria.

In various embodiments, the administrator feed 404 can be tailored to a particular administrator (e.g., the administrator User A). In other embodiments, the administrator feed 404 can be tailored to a page as a whole, inclusive of all administrators of the page (e.g., the Food Mart page). As such, various aspects of the page selection criteria and the story ranking criteria disclosed herein can be tailored for a particular administrator or for a particular page, depending on the desired implementation. For example, in the case of an administrator feed tailored to a particular administrator, the set of administrator selected pages can include only those pages selected by that particular administrator. Conversely, for an administrator feed tailored to a page, the set of administrator selected pages might include all pages selected by all administrators of the page. In another example, criteria for determining the set of successful pages, the set of potential collaborator pages, the set of potential interest pages, and/or story ranking criteria may be tailored to fit the preferences and interests of a particular administrator, or the preferences and interests of all administrators may be aggregated to represent the page's preferences and interests.

Figure 5:
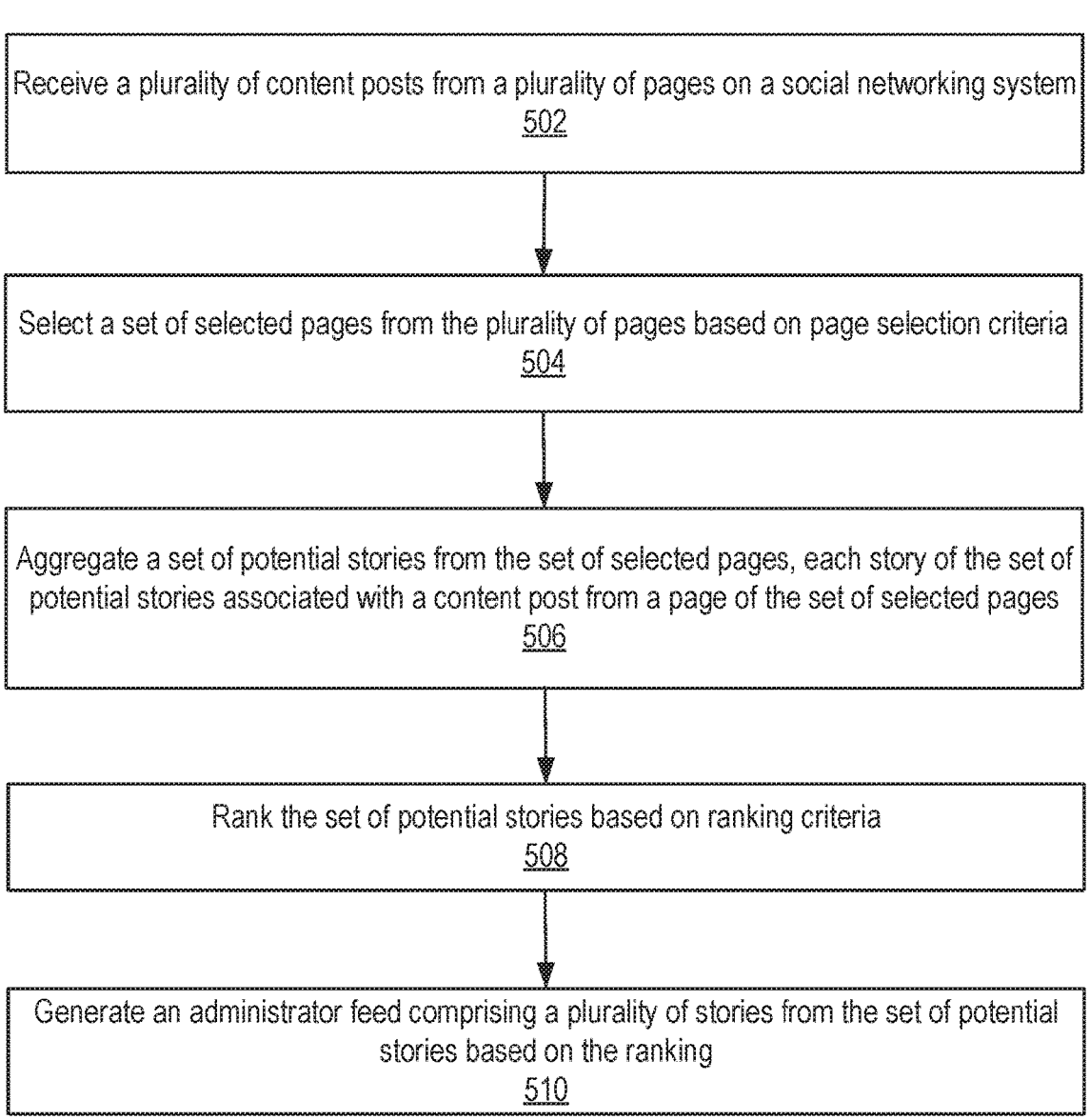
FIG. 5 illustrates an example method associated with providing an administrator feed, according to an embodiment of the present disclosure.

FIG. 5 illustrates an example method 500 associated with providing an administrator feed, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive a plurality of content posts from a plurality of pages on a social networking system. At block 504, the example method 500 can select a set of selected pages from the plurality of pages based on page selection criteria. At block 506, the example method 500 can aggregate a set of potential stories from the set of selected pages, each story of the set of potential stories associated with a content post from a page of the set of selected pages. At block 508, the example method 500 can rank the set of potential stories based on ranking criteria. At block 510, the example method 500 can generate an administrator feed comprising a plurality of stories from the set of potential stories based on the ranking. Other suitable techniques that incorporate various features and embodiments of the present technology are possible.

Social Networking System—Example Implementation

Figure 6:
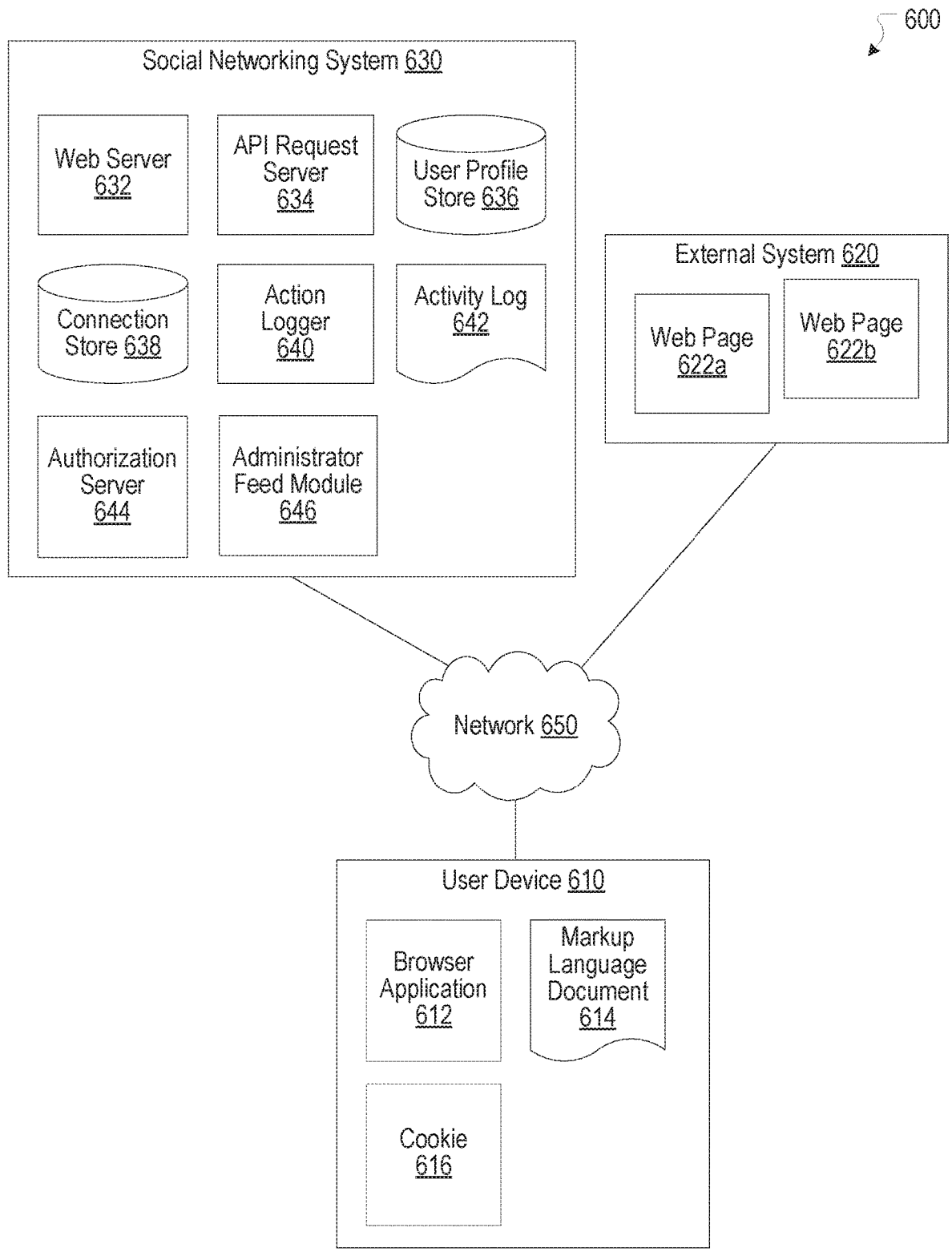
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution.

In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an administrator feed module 646. The administrator feed module 646 can, for example, be implemented as the administrator feed module 102, as discussed in more detail herein. As discussed previously, it should be appreciated that there can be many variations or other possibilities. For example, in some embodiments, one or more functionalities of the administrator feed module 646 can be implemented in the user device 610.

Hardware Implementation

Figure 7:
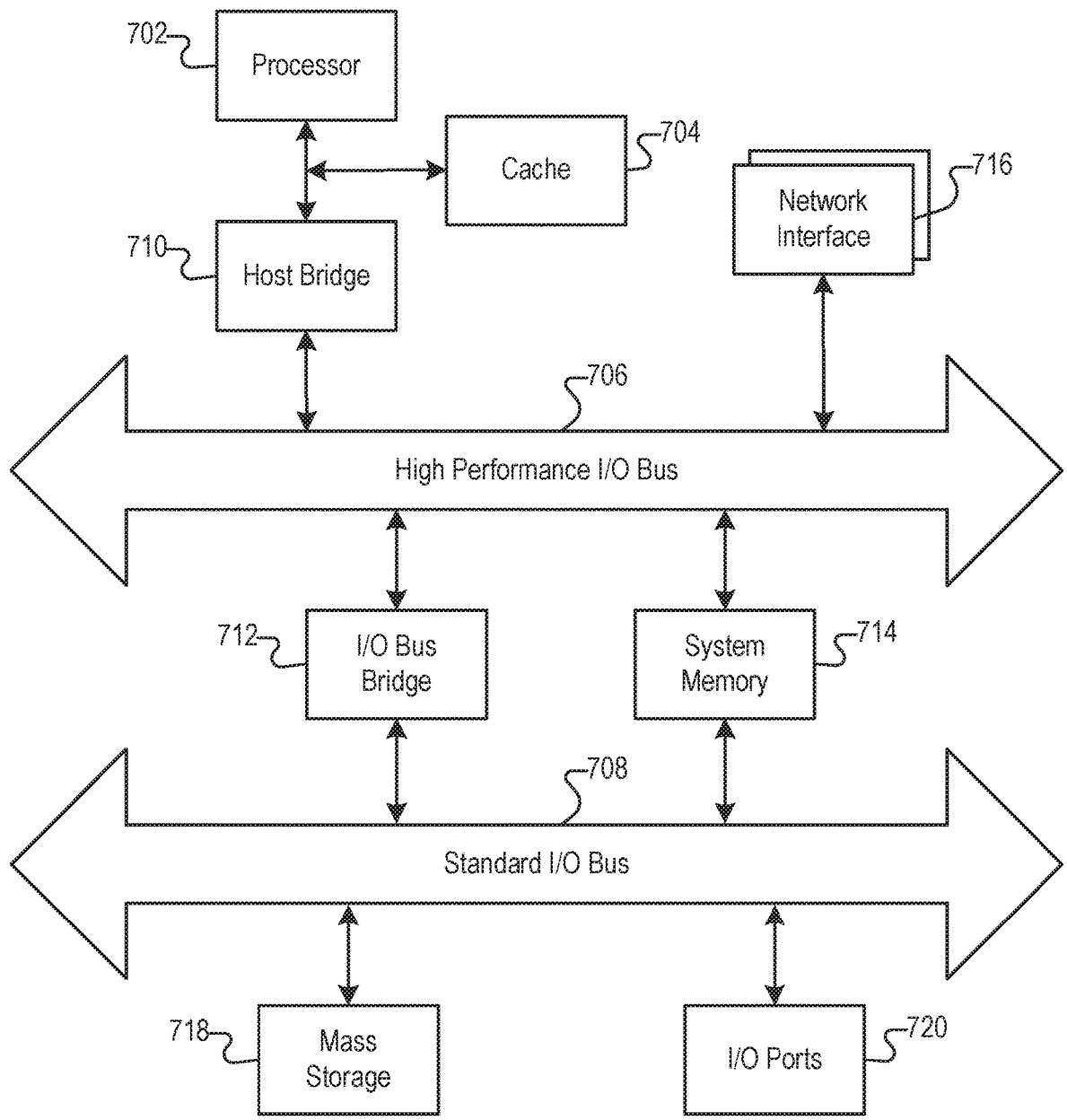
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

selecting, by a computing system, a set of selected pages from a plurality of pages on a system based on page selection criteria, wherein the set of selected pages are selected to populate a plurality of administrator feeds with content to be presented to a plurality of administrators of a first page on the system;

aggregating, by the computing system, a first set of potential stories and a second set of potential stories from the set of selected pages;

ranking, by the computing system, the first set of potential stories and the second set of potential stories based on ranking criteria, the ranking further comprising:

determining, by the computing system, a ranking for the first set of potential stories based on ranking criteria associated with a first administrator that manages the first page, wherein the first set of potential stories are ranked based at least in part on one or more past interactions associated with the first administrator in relation to one or more of the plurality of pages of the system; and determining, by the computing system, a ranking for the second set of potential stories based on ranking criteria associated with a second administrator that manages the first page, wherein the second administrator is different from the first administrator, and wherein the second set of potential stories are ranked based at least in part on one or more past interactions associated with the second administrator in relation to one or more of the plurality of pages of the system;

generating, by the computing system, a first administrator feed associated with the first administrator of the first page, the first administrator feed comprising a plurality of stories from the first set of potential stories based on the ranking the first set of potential stories; and generating, by the computing system, a second administrator feed associated with the second administrator of the first page, the second administrator feed comprising a plurality of stories from the second set of potential stories based on the ranking the second set of potential stories.

2. The computer-implemented method of claim 1, wherein the set of selected pages further comprises a set of administrator selected pages.

3. The computer-implemented method of claim 2, wherein the set of selected pages further comprises a set of automatically selected pages.

4. The computer-implemented method of claim 3, wherein the set of automatically selected pages further comprises at least one of: a set of successful pages, a set of potential collaborator pages, or a set of potential interest pages.

5. The computer-implemented method of claim 3, wherein
the set of automatically selected pages further comprises a set of similar pages selected based on the similarity criteria, and
the similarity criteria comprise at least one of: a similar location determination, a similar audience determination, or a similar category determination.

6. The computer-implemented method of claim 4, wherein
the set of automatically selected pages comprises a set of successful pages selected based on success criteria, and
the success criteria comprise at least one of: page audience size information, page social network engagement information, or page conversion information.

7. The computer-implemented method of claim 6, wherein inclusion in the set of successful pages requires satisfaction of a similarity threshold with reference to the first page.

8. The computer-implemented method of claim 1, wherein the ranking criteria is associated with a current administrator of the first page.

9. The computer-implemented method of claim 1, wherein the ranking criteria is associated with the first page.

10. The computer-implemented method of claim 1, wherein each story of the set of potential stories is associated with a content post on the system from a page of the set of selected pages.

11. A system comprising:
at least one processor; and
a memory storing instructions that, when executed by the at least one processor, cause the system to perform a method comprising:
selecting a set of selected pages from a plurality of pages on a system based on page selection criteria, wherein the set of selected pages are selected to populate a plurality of administrator feeds with content to be presented to a plurality of administrators of a first page on the system;
aggregating a first set of potential stories and a second set of potential stories from the set of selected pages;
ranking the first set of potential stories and the second set of potential stories based on ranking criteria, the ranking further comprising:
determining a ranking for the first set of potential stories based on ranking criteria associated with a first administrator that manages the first page, wherein the first set of potential stories are ranked based at least in part on one or more past interactions associated with the first administrator in relation to one or more of the plurality of pages of the system; and
determining a ranking for the second set of potential stories based on ranking criteria associated with a second administrator that manages the first page, wherein the second administrator is different from the first administrator, and wherein the second set of potential stories are ranked based at least in part on one or more past interactions associated with the second administrator in relation to one or more of the plurality of pages of the system;
generating a first administrator feed associated with the first administrator of the first page, the first administrator feed comprising a plurality of stories from the first set of potential stories based on the ranking the first set of potential stories; and
generating a second administrator feed associated with the second administrator of the first page, the second administrator feed comprising a plurality of stories from the second set of potential stories based on the ranking the second set of potential stories.

12. The system of claim 11, wherein the set of selected pages further comprises a set of administrator selected pages.

13. The system of claim 12, wherein the set of selected pages further comprises a set of automatically selected pages.

14. The system of claim 13, wherein the set of automatically selected pages further comprises at least one of: a set of successful pages, a set of potential collaborator pages, or a set of potential interest pages.

15. The system of claim 13, wherein
the set of automatically selected pages further comprises a set of similar pages selected based on the similarity criteria, and
the similarity criteria comprise at least one of: a similar location determination, a similar audience determination, or a similar category determination.

16. A non-transitory computer-readable storage medium including instructions that, when executed by at least one processor of a computing system, cause the computing system to perform a method comprising:
selecting a set of selected pages from a plurality of pages on a system based on page selection criteria, wherein the set of selected pages are selected to populate a plurality of administrator feeds with content to be presented to a plurality of administrators of a first page on the system;
aggregating a first set of potential stories and a second set of potential stories from the set of selected pages;
ranking the first set of potential stories and the second set of potential stories based on ranking criteria, the ranking further comprising:
determining a ranking for the first set of potential stories based on ranking criteria associated with a first administrator that manages the first page, wherein the first set of potential stories are ranked based at least in part on one or more past interactions associated with the first administrator in relation to one or more of the plurality of pages of the system; and
determining a ranking for the second set of potential stories based on ranking criteria associated with a second administrator that manages the first page, wherein the second administrator is different from the first administrator, and wherein the second set of potential stories are ranked based at least in part on one or more past interactions associated with the second administrator in relation to one or more of the plurality of pages of the system;

generating a first administrator feed associated with the first administrator of the first page, the first administrator feed comprising a plurality of stories from the first set of potential stories based on the ranking the first set of potential stories; and generating a second administrator feed associated with the second administrator of the first page, the second administrator feed comprising a plurality of stories from the second set of potential stories based on the ranking the second set of potential stories.

17. The non-transitory computer-readable storage medium of claim 16, wherein the set of selected pages further comprises a set of administrator selected pages.

18. The non-transitory computer-readable storage medium of claim 17, wherein the set of selected pages further comprises a set of automatically selected pages.

19. The non-transitory computer-readable storage medium of claim 18, wherein the set of automatically selected pages further comprises at least one of: a set of successful pages, a set of potential collaborator pages, or a set of potential interest pages.

20. The non-transitory computer-readable storage medium of claim 18, wherein
the set of automatically selected pages further comprises a set of similar pages selected based on the similarity criteria, and
the similarity criteria comprise at least one of: a similar location determination, a similar audience determination, or a similar category determination.

* * * * *